US012639038B2

(12) United States Patent
Ruan

(10) Patent No.: US 12,639,038 B2
(45) Date of Patent: May 26, 2026

(54) PIPELINED PROCESSING OF POLYNOMIAL COMPUTATION

(71) Applicant: Xilinx, Inc., San Jose, CA (US)

(72) Inventor: Ming Ruan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1159 days.

(21) Appl. No.: 17/542,016

(22) Filed: Dec. 3, 2021

(65) Prior Publication Data

US 2023/0176819 A1    Jun. 8, 2023

(51) Int. Cl.
*G06F 7/544*          (2006.01)

(52) U.S. Cl.
CPC ............ *G06F 7/5443* (2013.01); *G06F 7/544* (2013.01); *G06F 2207/5523* (2013.01)

(58) Field of Classification Search
CPC ........ G06F 7/544; G06F 7/552; G06F 7/5443; G06F 7/72; G06F 17/11; G06F 2207/5523; H04L 9/3026; H04L 9/3093
See application file for complete search history.

(56) References Cited

U.S. PATENT DOCUMENTS

| | | | | |
|---|---|---|---|---|
| 2010/0238305 A1* | 9/2010 | Dent | ..................... | F41G 7/2253 |
| | | | | 348/208.4 |
| 2014/0095572 A1* | 4/2014 | Bahary | ................. | G06F 7/5443 |
| | | | | 708/620 |
| 2018/0081634 A1* | 3/2018 | Mahurin | ............... | G06F 9/3001 |

| | | | | |
|---|---|---|---|---|
| 2020/0201629 A1* | 6/2020 | Rose | ......................... | G06F 7/57 |
| 2020/0265167 A1* | 8/2020 | Banerjee | ............... | H04L 9/0631 |
| 2023/0027423 A1* | 1/2023 | Rao | ........................ | G06F 7/5443 |

OTHER PUBLICATIONS

Breyosi Bhattacharyya, et al., Improved SIMD Implementation of Poly1305, Oct. 1, 2019.
U.S. Appl. No. 17/523,259, filed Nov. 10, 2021, and entitled: Circuits and Methods for Multiplying Large Integers Over a Finite Field. The Examiner is referred to the copending patent prosecution of the common Applicant (no attachment).

* cited by examiner

*Primary Examiner* — Matthew D Sandifer
(74) *Attorney, Agent, or Firm* — Patterson + Sheridan, LLP

(57) ABSTRACT

Circuits and methods for computing an order N polynomial include V decimation stages, each stage including respective multiply-and-accumulate circuitry. The multiply-and-accumulate circuitry in each stage k, in response to an input r-term and a plurality of input z-terms 0 through $(N_k-1)$, generates output z-terms 0 through $(N_k/2-1)$ and an output r-term as a square of the input r-term. Each output z-term i is a sum of input z-term $(2i+1)$ of the input z-terms and a product of input z-term 2i and the input r-term. The multiply-and-accumulate circuitry in decimation stages k for $k \le (V-1)$ provides the output r-term and one or more output z-terms from decimation stage k as the input r-term and one or more input z-terms to the respective multiply-and-accumulate circuitry of decimation stage k+1. A recursive stage inputs from decimation stage V, the output r-term as a recursive r-term and the output z-terms as a-terms, and generates a polynomial output value z by a recursive evaluation of the recursive r-term, the a-terms, and a modulus, p.

20 Claims, 6 Drawing Sheets

PIPELINED PROCESSING OF POLYNOMIAL COMPUTATION

TECHNICAL FIELD

The disclosure generally relates to computation of polynomials by pipelined circuitry.

BACKGROUND

High-order polynomials are widely used in cryptography algorithms. Addition, multiplication, and exponential operations are in a finite field defined by a large prime number p.

A traditional recursive expression for computing the polynomial is:

$$z = \left( \underbrace{\left( \underbrace{\left( \underbrace{(a_0 r + a_1) r + a_2}_{z_1} \right) r + a_3}_{z_2} \right) r + \dots a_{N-1}}_{z_3} \right) \cdot r \bmod p$$

The coefficients, $a_k$, and the key, r, are large integers that change with each input polynomial. The polynomial can be computed recursively as follows:

$$Z_1 = (a_0 * r + a_1) \bmod p$$

$$Z_2 = (Z_1 * r + a_2) \bmod p$$

$$Z_3 = (Z_2 * r + a_3) \bmod p$$

$$Z_4 = (Z_3 * r + a_4) \bmod p$$

$$\dots$$

$$Z_k = (Z_{k-1} * r + a_k) \bmod p$$

$$\dots$$

$$Z_{N-1} = (Z_{N-2} * r + a_{N-1}) \bmod p$$

$$Z = (Z_{N-1} * r) \bmod p$$

Though this method only needs N multiply-and-accumulate (MAC) operations, which is the minimum possible, the recursive approach requires the computation of $Z_{k+1}$ to start after $Z_k$ becomes available. However, the rate at which polynomial data is input may be greater than the rate at which $Z_k$ can be computed. As a result, the cycles during which $Z_k = (Z_{k-1} * r + a_k) \bmod p$ is computed reduce throughput.

In addition to reduced throughput, the traditional recursive approach to computing a polynomial may require a large buffer to store input polynomials as the polynomials processed. As the orders of the polynomials can vary from 3 to 2048 or even higher, the processing time required compute a polynomial can vary from one polynomial to the next. As a result processing of shorter polynomials can be completed faster than longer polynomials, and the order of completion may be different from the order of input. Also, the rate at which polynomial data is input may be greater than the rate at which the polynomial can be computed. Therefore, a complicated buffer management algorithm is required to ensure the memories are allocated and released correctly.

SUMMARY

A disclosed circuit arrangement for computing an order N polynomial includes a plurality of V decimation stages. Each decimation stage includes respective multiply-and-accumulate circuitry. The respective multiply-and-accumulate circuitry in each decimation stage k of the V decimation stages is configured to, in response to an input r-term and a plurality of input z-terms 0 through $(N_k-1)$ generate one or more output z-terms 0 through $(N_k/2-1)$, and generate an output r-term as a square of the input r-term. Each output z-term i of the one or more output z-terms is a sum of input z-term $(2i+1)$ of the input z-terms and a product of input z-term 2i and the input r-term. The respective multiply-and-accumulate circuitry in each decimation stage k for $k \leq (V-1)$ is configured to provide the output r-term and one or more output z-terms from decimation stage k as the input r-term and one or more input z-terms to the respective multiply-and-accumulate circuitry of decimation stage k+1. The circuit arrangement includes a recursive stage having multiply-and-accumulate circuitry. The multiply-and-accumulate circuitry is configured to input from the respective multiply-and-accumulate circuitry of decimation stage V, the output r-term as a recursive r-term and the one or more output z-terms as a-terms 0 through $(T-1)$, and generate a polynomial output value z by a recursive evaluation of the recursive r-term, the a-terms 0 through $(T-1)$, and a modulus, p.

A disclosed method for computing an order N polynomial includes performing by respective multiply-and-accumulate circuitry in each decimation stage k of a plurality of V decimation stages, in response to an input r-term and a plurality of input z-terms 0 through $(N_k-1)$, operations including generating one or more output z-terms 0 through $(N_k/2-1)$ and generating an output r-term as a square of the input r-term.

Each output z-term i of the one or more output z-terms is a sum of input z-term $(2i+1)$ of the input z-terms and a product of input z-term 2i and the input r-term. The method includes providing, by the respective multiply-and-accumulate circuitry in each decimation stage k for $k \leq (V-1)$, the output r-term and one or more output z-terms from decimation stage k as the input r-term and one or more input z-terms to the respective multiply-and-accumulate circuitry of decimation stage k+1. The method includes multiply-and-accumulate circuitry in a recursive stage circuitry inputting from the respective multiply-and-accumulate circuitry of decimation stage V, the output r-term as a recursive r-term and the one or more output z-terms as a-terms 0 through $(T-1)$, and generating a polynomial output value z by a recursive evaluation of the recursive r-term, the a-terms 0 through $(T-1)$, and a modulus, p.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figure 1:
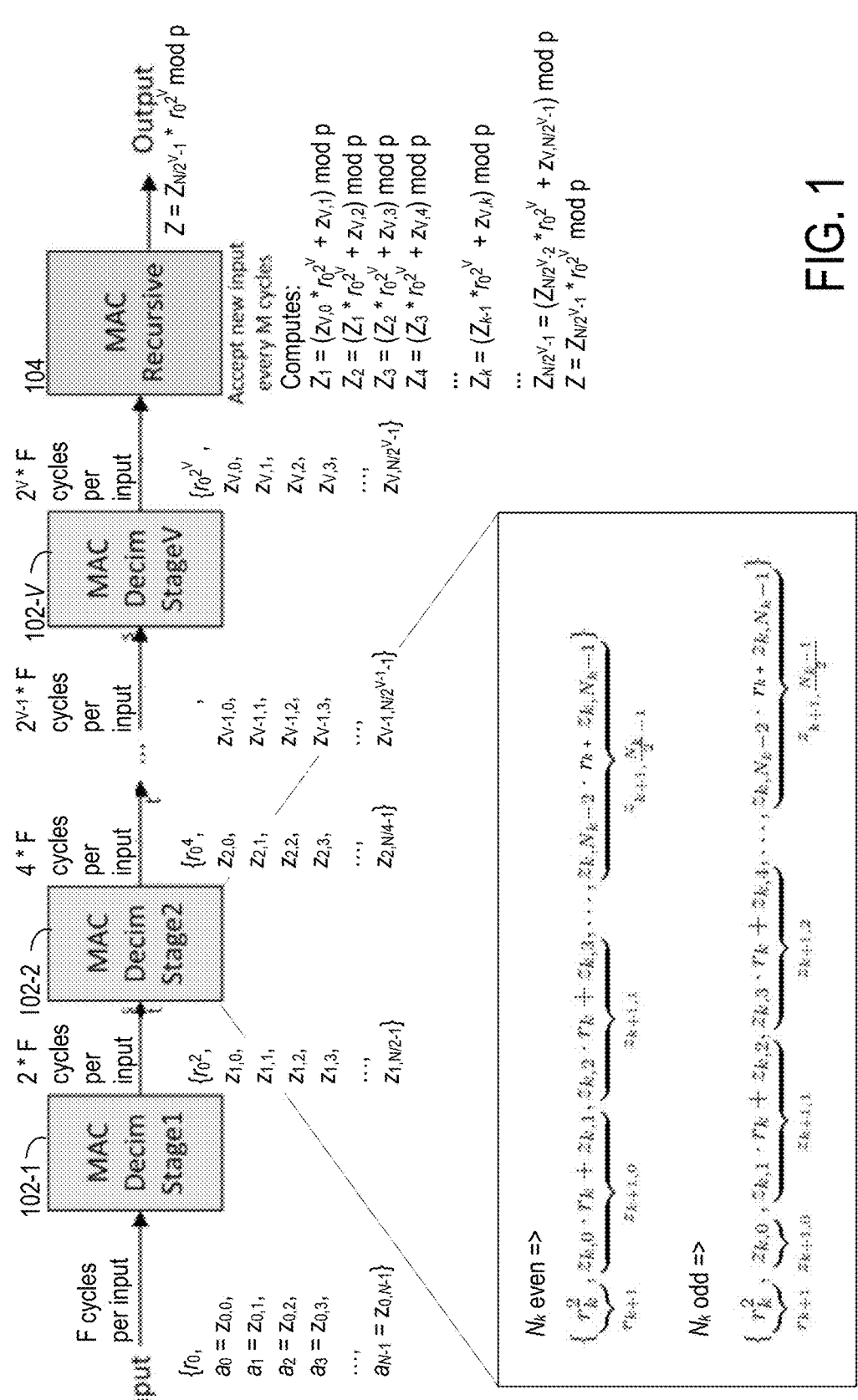
FIG. 1 shows a system 100 for computing a polynomial according to the disclosed circuits and methods.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

According to the disclosed circuits and methods, pipelined circuitry is employed to compute a polynomial. The pipelined circuitry achieves very high throughput and allows low-complexity line-rate processing without input/output buffers, which simplifies system design, reduces memory requirements, and reduces processing latency.

The pipelining resolves the mismatch between a desired rate at which polynomial data is to be input for processing (the "line rate") and the rate at which recursive computation of the polynomial can be performed. The pipelined circuitry implements multiple decimation stages that are configured to reduce the number polynomial terms provided to circuitry of a recursion stage that generates the final output. The pipelined decimation stages effectively reduce the rate at which input data is provided to the recursive stage, which enables input of polynomial data at the desired line rate without the need for buffering.

For general application, the required line rate can be assumed to be F cycles per unit of input data. F can be a fractional number when more than one unit per clock cycle is desired. For a recursive stage that accepts a new unit of data every M clock cycles, V pipelined, decimate-by-two stages would be implemented to enable the recursive stage to process polynomial data input to the pipeline at the line rate. Thus, the pipelined circuitry for computing a polynomial can process input data at the desired line rate, as long as the following inequality is satisfied:

$$2^V * F \geq M = > V \geq \log_2(M/F)$$

High-order polynomials are widely used in cryptography algorithms. Generally, those polynomials can be written into the following form, where all the additions, multiplications and exponential operations are in a finite field defined by a large prime number p, and the coefficients $\{a_k\}$ and the variable x are large integers changing every polynomial:

$$f(x \mid a_0, a_1, \ldots, a_{N-1}) = \sum_{k=0}^{N-1} a_k \cdot x^{N-k}$$

The polynomial in the equation above can be evaluated by cascading the decimation stages as follows (x replaced by r):

$$
\begin{aligned}
z &= \left( \underbrace{(a_0 \cdot r + a_1)r^{N-1}}_{z_{1,0}} + \underbrace{(a_2 \cdot r + a_3)r^{N-3}}_{z_{1,1}} + \cdots \underbrace{(a_{N-1} \cdot r + 0)}_{z_{1,N/2-1}} \right. \\
&= \left( \underbrace{(z_{1,0} \cdot r^2 + z_{1,1})r^{N-3}}_{z_{2,0}} + \underbrace{(z_{1,2}r^2 + z_{1,3})r^{N-7}}_{z_{2,1}} + \cdots \underbrace{(z_{N/2-2}r^2 + z_{N/2-1})}_{z_{2,1}} \right. \\
&\vdots \\
&= \sum_{k=0}^{\frac{N}{2^V}-1} z_{V,k} \cdot \left( r^{2^V} \right)^{\frac{N}{2^V}-1-k} \mod p
\end{aligned}
$$

To simplify the expression, the order of the polynomial, N, is assumed to be an integer power of 2. For other orders, 0 padding can be added to the first term as may be needed.

FIG. 1 shows a system 100 for computing a polynomial according to the disclosed circuits and methods. The system includes V decimation stages 102-1, 102-2, . . . , 102-V, and a recursive stage 104. The decimation stages have multiply-and-accumulate circuitry arranged in a pipeline to provide input to the recursive stage, and the recursive stage includes multiply-and-accumulate circuitry configured to recursively evaluate the input terms to generate the final computed result of the polynomial.

Generally, the input data to decimation stage k can be denoted as:

$$\{r_k, z_{k;0}, Z_{k;1}, Z_{k;2}, \ldots, Z_{k;Nk-1}\}$$

The "z" variables are numbered from 0 to $(N_k-1)$ and are referenced as "z-terms". The variable, "r," can be referenced as the "r-term." The initial polynomial data input to the first stage 102-1 is:

$$\{r_0, a_0, a_1, Z_2, \ldots, a_{N-1}\}$$

which is equivalent to:

$$\{r_0, z_{0;0}, Z_{0;1}, Z_{0;2}, \ldots, Z_{0;Nk-1}\}$$

The respective multiply-and-accumulate circuitry in each decimation stage inputs polynomial data (an "r-term" and "z-terms") as indicated above, and generates a square of the input r-term and generates one or more output z-terms. The output z-terms are numbered 0 through $(N_k/2-1)$. If $N_k$ is even, the output r-term and output z-term(s) computed by decimation stage k, which are the input r-term and input z-terms for decimation stage (k+1), are as follows:

$$\left\{ \underbrace{r_k^2}_{r_{k+1}}, \underbrace{z_{k,0} \cdot r_k + z_{k,1}}_{z_{k+1,0}}, \underbrace{z_{k,2} \cdot r_k + z_{k,3}}_{z_{k+1,1}}, \cdots, \underbrace{z_{k,N_k-2} \cdot r_k + z_{k,N_k-1}}_{z_{k+1,\frac{N_k}{2}-1}} \right\}$$

As shown, each output z-term i, which is input to stage (k+1), is a sum of input z-term (2i+1) and a product of input z-term 2i and the input r-term.

Otherwise, $N_k$ is odd, and the output r-term and output z-term(s) computed by decimation stage k, which are the input r-term and input z-terms for decimation stage (k+1), are as follows:

$$\left\{ \frac{r_k^2}{r_{k+1}}, \frac{z_{k,0}}{z_{k+1,0}}, \frac{z_{k,1} \cdot r_k + z_{k,2}}{z_{k+1,1}}, \frac{z_{k,3} \cdot r_k + z_{k,4}}{z_{k+1,2}}, \cdots, \frac{z_{k,N_k-2} \cdot r_k + z_{k,N_k-1}}{z_{k+1,\frac{N_k}{2}-1}} \right\}$$

As shown, the value of output z-term 0 is assigned the value of input z-term 0. Each output z-term i, for $1 \leq i \leq (N_k/2-1)$ and input to stage (k+1) is generated as the sum of input z-term (2i+1) and a product of input z-term 2i and the input r-term.

The instances of the multiply-and-accumulate circuitry in the decimation stages are pipelined. The respective multiply-and-accumulate circuitry in each decimation stage k for $k \leq (V-1)$ is configured to provide the output r-term and the output z-term(s) as the input r-term and or more input z-term(s) to the respective multiply-and-accumulate circuitry of the next decimation stage k+1. The pipelining enables decimation stage (k+1) to process an output data term generated by decimation stage k, concurrent with decimation stage k generating the next output data term for processing by decimation stage (k+1). For example, after the first decimation stage 102-1 has generated and output $z_{1,0}$, the second decimation stage 102-2 can commence processing of $z_{1,0}$, as input while the first decimation stage 102-1 is generating $z_{1,1}$. The r-term and the z-term(s) output from the $V^{th}$ decimation stage 102-V (the last decimation stage in the pipeline) are input to the recursive stage 104. Depending on the order of the polynomial, one or more z-terms can be input to the recursive stage.

Notably, the number of output z-terms generated by each decimation stage is approximately one-half the number of input z-terms, which reduces the rate at which polynomial terms are provided from each stage by one-half. The cumulative effect is that if there are F cycles between input of each term to the first decimation stage, there are $(2^V \cdot F)$ cycles between input of each term input to the recursive stage 104.

The recursive stage has multiply-and-accumulate circuitry configured to generate the final polynomial output value by recursive evaluation of the input r-term, z-term(s), and a modulus, p. The multiply-and-accumulate circuitry of the recursive stage is configured to generate a first recursive z-term (Zi in FIG. 1) as a sum of the second input z-term ($z_{V,1}$ in FIG. 1) and a product of the first input z-term ($z_{V,0}$) and the input r-term, modulo p. Thereafter, the multiply-and-accumulate circuitry of the recursive stage generates a recursive z-term t (for $t=Z_2$ through $Z_{N/2^V-1}$)) for each input z-term 2 through ($z_{N/2^V-1}$), as a sum of the input z-term and a product of the input r-term and the recursive z-term (t-1). The last computation of the multiply-and-accumulate circuitry of the recursive stage is to generate the polynomial output value z as a product of the last computed recursive z-term ($Z_{N/2^V-1}$) and the input r-term, modulo p.

The multiply-and-accumulate circuitry of the decimation stages 102-1, 102-2, . . . 102-V and the recursive stage 104 can be implemented on field programmable gate arrays (FPGAs), application specific integrated circuits (ASICs), graphics processing units (GPUs), vector processing units (VPUs), or combinations thereof.

Figure 2:
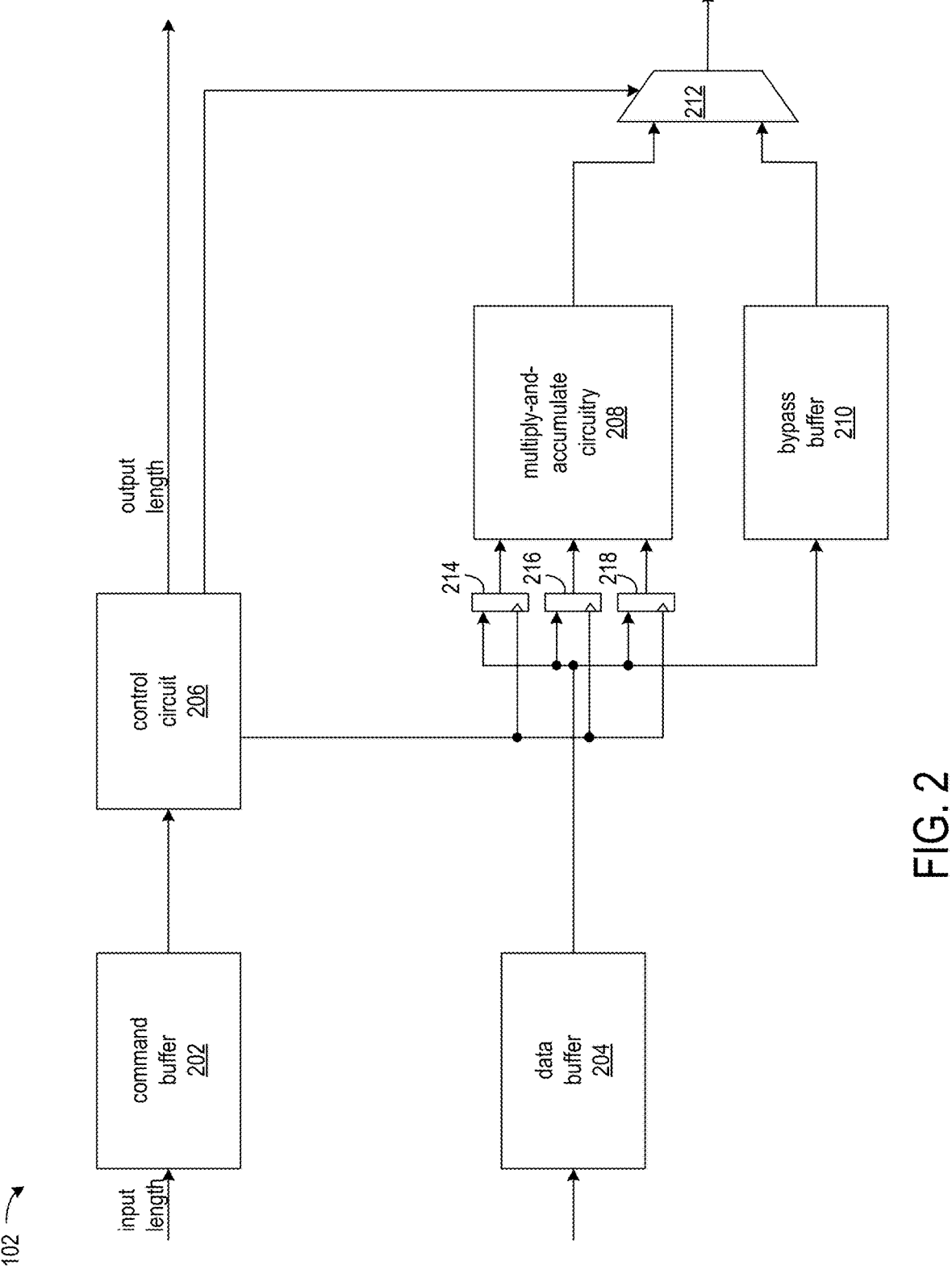
FIG. 2 shows exemplary circuitry of a decimation stage.

FIG. 2 shows exemplary circuitry of a decimation stage 102. The circuitry includes a first-in-first-out (FIFO) command buffer 202, a FIFO data buffer 204, a control circuit 206, multiply-and-accumulate circuitry 208, a FIFO bypass buffer 210, and selection circuit 212.

Polynomial data are input to the FIFO data buffer 204 having a width and depth that depends on a number of factors. If the finite field P is W bits and F is the number of clock cycles per input data, the width of the FIFO data buffer can be max (W/F, W) in order to match the data throughput of the decimation stage. For example, at the first decimation stage where F=1/2 clock cycle per input data, the FIFO can be 2 W bits wide. In subsequent decimation stages, the FIFO data buffer width is W bits to match the output.

The depth of the FIFO data buffer accounts for the difference in the arrival time of command and data at the first decimation stage. At later stages, depending on the implementation, there may be a need to adjust the delay slightly to realign the data and command. The selection of the depth of the FIFO data buffer is design dependent.

As polynomial data are read out and processed by the multiply and accumulate circuitry or fed through the bypass buffer, additional polynomial data can be input to the FIFO data buffer. The order in which data of a polynomial are input can be the r-term followed by the z-terms in order of z-term 0 through z-term (N−1). The FIFO data buffer can store data of multiple polynomials at the same time depending on the length of the polynomials.

At the first decimation stage, the depth of the FIFO command buffer is determined by the minimum order of polynomial and the difference between the arrival times of data and a command. In decimation stages that follow the first stage, having a FIFO command buffer to synchronize the data and command or having a fully synchronized data path to avoid having any FIFO command buffers depends on design objectives.

As the purpose of the bypass FIFO is to equalize the latency with the multiply-and-accumulate circuitry, the depth is determined by the processing rate of the multiply-and-accumulate circuitry, and the width can be the same as that of the FIFO data buffer. Without any assumption about the minimum order of the polynomial, the width can be as wide as the prime number P.

As the FIFO data buffer 204 stores raw polynomial data (no metadata to indicate the beginning and end of a polynomial), the FIFO command buffer 202 is provided to store lengths of polynomials as the polynomial data are input to the FIFO data buffer. As the first term(s) of a polynomial is input to the FIFO data buffer, the length of that polynomial is stored in the FIFO command buffer.

The control circuit reads a length from the FIFO command buffer and based on the length determines: the beginning and end of data of a polynomial, whether the next term to read from the FIFO data buffer is an r-term or z-term, whether or not the next term should be stored in the FIFO bypass buffer 210, and determines which input registers 214, 216, and 218 of the multiply-and-accumulate the next term(s) read from the FIFO data buffer are to be stored for processing.

Two of registers 214, 216, and 218 can store the terms that are to be multiplied ("factors"), and the other register can store the term to be summed ("addend") with the product. For example, registers 214 and 216 can be factor registers, and register 218 can be an addend register. In response to processing $r_k \cdot r_k$, the control circuit stores $r_k$ in both of the factor registers and stores 0 in the addend register. In response to the length of the polynomial being odd and the next term from the FIFO data buffer being $Z_{k,0}$, the control circuit stores $z_{k,0}$, in the FIFO bypass buffer. In response to processing of $z_{k,i} \cdot r_k + z_{k,i+1}$, the control circuit maintains $r_k$ in one of the factor registers, stores $z_{k,i}$ in the other factor register, and stores $z_{k,i+1}$ in the addend register.

The control circuit also uses the FIFO bypass buffer in response to the length of the input polynomial being one. That is, when the input polynomial to the first decimation stage has an order that is less than twice the number of decimation stages ($N<(2*V)$), the number of z-terms will be reduced to one z-term before reaching the last decimation stage. Once a decimation stage has reduced the number of z-terms to one, decimation stages that follow can bypass the multiply-and-accumulate circuitry. The input r-term and input z-term can be stored in the FIFO buffer for output at the proper time (i.e., output after the computation of a previously input polynomial).

The control circuit 206 controls the selection circuit/multiplexer 212 to select for output, either the output from the multiply-and-accumulate circuitry 208 or the output from the FIFO bypass buffer. The possible inputs to the multiply-and-accumulate circuit of a decimation stage include an r-term, z-term, and a constant 0. The control circuit determines whether to input terms for the multiply-and accumulate circuit to compute r*r+0 or z*r+z, or to send the z-term to the FIFO bypass buffer. In response to the control circuit inputting data to the multiply-and-accumulate circuit for computation, then after T clock cycles, where T is the latency of the multiply-and-accumulate circuit, the control circuit selects output of the multiply-and-accumulate circuit. In response to input of data to the FIFO bypass buffer, the control circuit selects the output from the FIFO bypass buffer after T clock cycles.

Depending on the order of input polynomials, each successive decimation stage may output approximately one-half the number of z-terms that are input and read from the FIFO command buffer and FIFO data buffer at one-half the rate of the previous stage. However, input of a stream of low order polynomials can result in some number of stages after the first several stages bypassing the multiply-and-accumulate circuit and have the same input/output rates.

The multiply-and-accumulate circuitry 208 can be implemented on field programmable gate arrays (FPGAs), application specific integrated circuits (ASICs), graphics processing units (GPUs), vector processing units (VPUs), or combinations thereof.

According to one exemplary, non-limiting approach, the multiply-and-accumulate circuitry of the decimation stages and recursive stage can be implemented by partitioning the operands into limbs and employing configurable arithmetic circuits of FPGAs or shift-and-add circuits in ASICs. The flexibility in limb-width can enable high performance hardware implementations, both in FPGAs and ASICs. The method and circuits can be efficiently mapped to arithmetic circuits of FPGAs according to the supported maximum bit width. For ASIC implementations, the flexibility in limb-width selection can reduce area and power consumption.

According to the exemplary implementation, large integer operands are partitioned into limbs having a bit-width that is compatible with arithmetic circuits of target hardware, and the operand bit-width need not be an integer multiple of the number of limbs. Exemplary arithmetic circuits include DSP48 and DSP58 circuits found in programmable devices from Xilinx, Inc. Notably, one of the operands is partitioned into two sets of limbs, and the other operand is partitioned into one set of limbs. One set of the two sets of limbs of the one operand has limbs resulting from partitioning the operand from the least significant bit (LSB) to the most significant bit (MSB), and the other set of the two sets has limbs resulting from partitioning the operand from the MSB to the LSB. The set of limbs of the other operand are a result of partitioning the other operand from the LSB to the MSB. Once partitioned, the two sets of limbs of the one operand and the one set of limbs of the other operand can be input to an array of arithmetic circuits that multiply and accumulate partial products of the limbs to produce an intermediate value, Z. A modulo circuit computes the final value Y as a function of Z, the modulus, m, and the bit-width Z relative to the bit-width of the operands.

The basis for partitioning the large operands, the configuration of the array of arithmetic circuits, and the logic of the modulo circuit is described below. Multiplication of two N-bit integers, A and R, over a finite field, $P=2^N-m$, is defined as: $Y=(A*R+B) \bmod P$. The modulus, m, is a small integer for ease of implementation.

Though the disclosed methods and circuits are described with examples that involve addition of the B term to the product of the large integers, it will be recognized that the multiplication and modulo methods and circuits can also be applied to implementations that do involve adding a term to the product. Thus, the addition of the B term is optional in the methods and circuits.

The large integers can be partitioned into as a summation of K smaller integers that are referred to as "limbs." The first (K−1) limbs from LSB to MSB have bit-width l, the last limb (Kth limb) has bit-width j, where $j=N-(K-1)\cdot l$ and $j\leq l$. The large integers can be expressed as the following summations:

$$A = \sum_{k=0}^{K-2} a_k \cdot 2^{k\cdot l} + \hat{a}_{K-1} \cdot 2^{(K-1)l}$$

$$A_{N-1,j} = \sum_{k=1}^{K-1} d_k \cdot 2^{(k-1)\cdot l}$$

$$R = \sum_{k=1}^{K-1} r_k \cdot 2^{k\cdot l}$$

$$B = \sum_{k=1}^{K-1} b_k \cdot 2^{k\cdot l}$$

where:
$\alpha_k = A_{(k+1)l-1:kl}$, $k \in [0, K-2]$; l-bits
$\hat{\alpha}_k = A_{(kl+j-1):kl}$ j-bits
$d_k = A_{j+kl-kj+(k-1)l}$, $k \in [1, K-1]$; l-bits
$r_k = R_{(k+1)l-1:kl}$, $k \in [0, K-2]$; l-bits
$r_{k-1} = R_{N-1:(K-1)l}$ j-bits
$b_k = B_{(k+1)l-1:kl}$, $K \in [0, K-2]$; l-bits
$b_{K-1} = B_{N-1:(K-1)l}$ j-bits
Note that $\hat{a}_k$ is defined to be the least significant j bits of $a_k$.

The large integer multiplication over a finite field entails two main steps, multiplication and modulo. The following derivation demonstrates how the limbs of the partitioned operands can be multiplied and accumulated into an intermediate term, Z, in preparation for the modulo step. In the following derivation=means equal, and represents equal in modulo arithmetic.

$$Z = A*R + B = \sum_{k=0}^{K-1} 2^{lk} \cdot r_k \cdot A_{N-1:0} + \sum_{k=0}^{K-1} 2^{lk} b_k =$$

-continued $$\sum_{k=0}^{K-1} 2^{lk} \cdot (r_k \cdot A_{N-1-lk:0}) + 2^N \cdot \sum_{k=1}^{K-1} r_k \cdot A_{N-1:N-lk} + \sum_{k=0}^{K-1} 2^{lk} b_k \equiv$$

$$2^{l(K-1)} \sum_{k=0}^{K-1} r_k \cdot \hat{a}_{K-1-k} + \sum_{k=0}^{K-1} 2^{lk} r_k \cdot \sum_{t=0}^{K-k-2} a_t 2^{lt} + m \cdot \left( \sum_{k=1}^{K-1} r_k \sum_{t=0}^{k-1} d_{K-k+t} 2^{lt} \right) +$$

$$\sum_{k=0}^{K-1} 2^{lk} b_k = 2^{l(K-1)} \sum_{k=0}^{K-1} r_k \cdot \hat{a}_{K-1-k} + \sum_{k=0}^{K-2} \sum_{t=k}^{K-2} r_k \cdot a_{t-k} \cdot 2^{lt} +$$

$$m \cdot \left( \sum_{k=1}^{K-1} \sum_{t=0}^{k-1} r_k \cdot d_{K-k+t} \cdot 2^{lt} \right) + \sum_{k=0}^{K-1} 2^{lk} \cdot b_k = 2^{l(K-1)} \sum_{k=0}^{K-1} r_k \cdot \hat{a}_{K-1-k} +$$

$$\sum_{t=0}^{K-2} \sum_{k=0}^{t} r_k \cdot a_{t-k} \cdot 2^{lt} + m \cdot \sum_{t=0}^{K-2} \sum_{k=t+1}^{K-1} r_k \cdot d_{K-k-t} \cdot 2^{lt} + \sum_{k=0}^{K-1} 2^{lk} \cdot b_k =$$

$$2^{l(K-1)} \left( b_{K-1} + \sum_{k=0}^{K-1} r_k \cdot \hat{a}_{K-1-k} \right) + \sum_{t=0}^{K-2} 2^{lt} \cdot \left( b_t + \sum_{k=0}^{t} r_k \cdot a_{t-k} + m \sum_{k=t+1}^{K-1} r_k \cdot d_{K-k-t} \right)$$

Note that each bracket in the last equation contains a summation of K products, which can be a mixture of l×l bits and l× l+ceil (log 2 m)) bits. The intermediate term, Z, can have up to N+l+ceil (log 2 K) bits, which reduces the size from 2N bits as a result of substitution of the modulus m for 2N in the derivation. The derived multiplication can be applied to large integer operands independent of whether N is evenly divisible by K.

The intermediate value Z produced by the last equation is not necessarily in the field $(2^N-m)$, so a modulo operation is performed. In deriving the computation of the modulo, it is assumed that the bit-width of Z is N bits+M bits, and Q=M+ceil (log 2 m). The modulo Y can be computed as follows:

$$Y = \left( Z_{N+M-1:N} \cdot 2^N + Z_{N-1:Q} \cdot 2^Q + Z_{Q-1:0} \right) \quad \text{mod} P$$

$$= \left( Z_{N+M-1:N} \cdot m + Z_{N-1:Q} \cdot 2^Q + Z_{Q-1:0} \right) \quad \text{mod} P$$

$$= \left( Z_{N-1:Q} \cdot 2^Q + \left( Z_{N+M-1:N} \cdot m + Z_{Q-1:0} \right) \right) \quad \text{mod} P$$

For small values of m, in the right-hand side of the last equality, the second term can have at most Q+1 bits. Thus, the long addition of N-bit integers is reduced to Q bits. In addition, it is possible for the sum from the last equality to exceed $2^N-m$. To avoid multiple modulo operations, which would introduce latency and reduce throughput, the disclosed methods and circuits implement the following algorithm.

1. Compute $G=Z_{N+M-1:N} \cdot m+Z_{Q-1:0}$, which is Q+1 bits long.
2. If $Z_{N-1:Q}=2^{N-Q}-1$, and $G \geq 2^Q-m$, then G=G+m.
3. $Y_{Q-1:0}=G_{Q-1:0}$ and $Y_{N-1:Q}=Z_{N-1:Q}+G_Q$.

Figure 3:
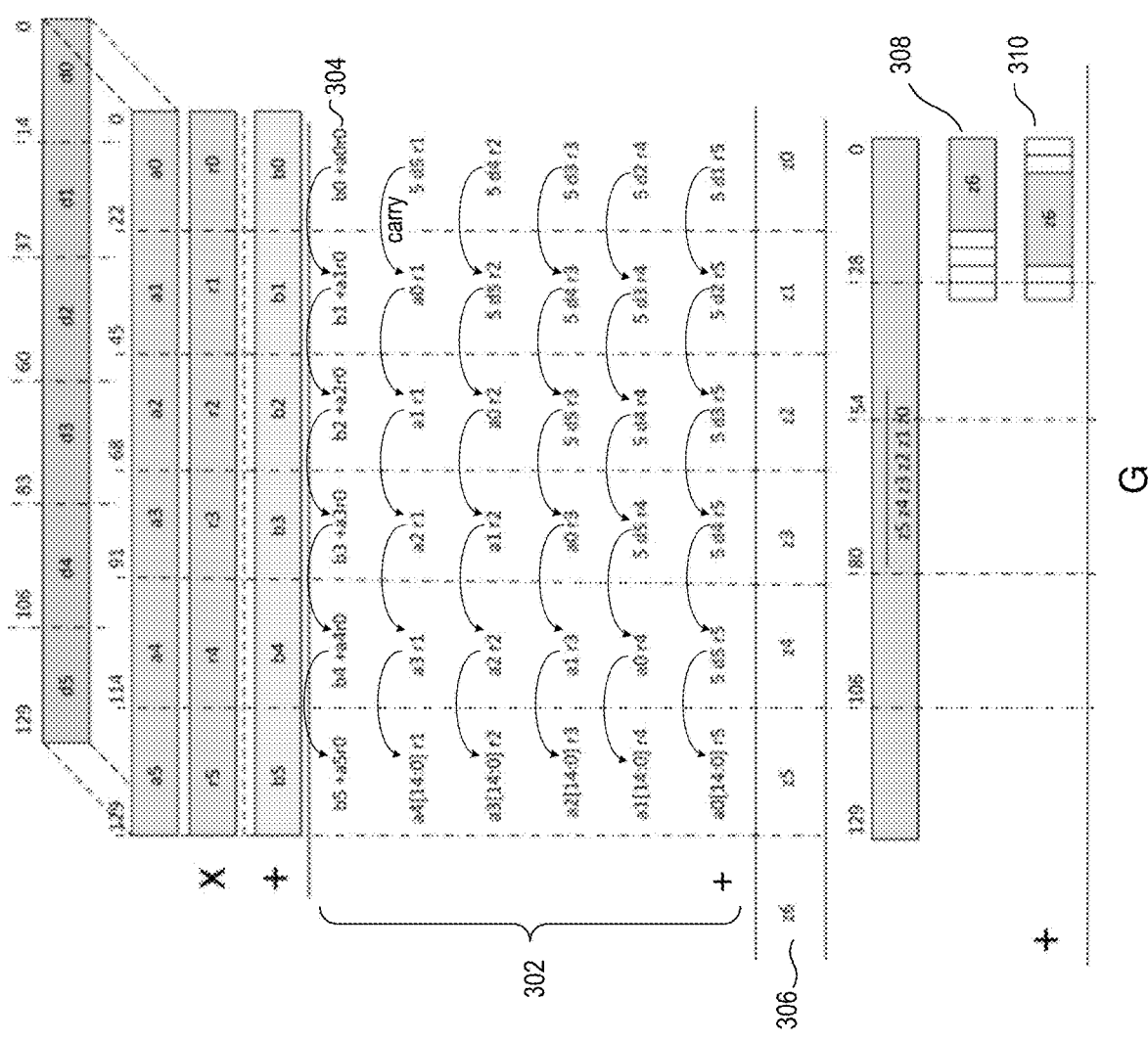
FIG. 3 illustrates an example that shows how the disclosed methods and circuits can be applied to computation of a Poly1305 code.

FIG. 3 illustrates an example that shows how the disclosed methods and circuits can be applied to computation of a Poly1305 code. The example shows computation of A*R+B to produce the value of the intermediate term, Z, and computation of G per step 1 of the modulo algorithm described above. A, R, and B are 130 bits wide, and the modulus is 5. Relative to the derivation described above, N=130, m=5, K=6, l=23, and j=15.

The top four rows in the example show the partitioning of A, R, and B. A is partitioned into a-limbs a0-a5 and d-limbs d0-d5, R is partitioned into r-limbs r0-r5, and B is partitioned into b-limbs b0-b5. The partitioning of A into a-limbs, R into r-limbs, and B into b-limbs is from the LSB to MSB. In contrast, the d-limbs partitioned from A are formed from MSB to LSB.

As N=130 and K=6, the a-limbs a0 through a4 bits are 23 bits wide, and a-limb a5 is 15 bits wide. The d-limb d0 is 15 bits wide, and d-limbs d1-d5 are 23 bits wide. The r-limbs r0 through r4 bits are 23 bits wide, and r-limb r5 is 15 bits wide. The b-limbs b0 through b4 bits are 23 bits wide, and b-limb b5 is 15 bits wide.

The rows in section 302 show multiplication of limbs to form partial products ("intermediate z-limbs"). The organization of section 302 can correspond to a configuration of an array of arithmetic circuits configured to compute the partial products and accumulate the partial products into z-limbs. Each row shows the intermediate z-limbs generated from one of the r-limbs. In general terms, a respective set of intermediate z-limbs 0 through K−1 is generated for each r-limb i for i=0 to K−1. Row 304 shows partial products of r0 and a0 through a5. In general terms, an array of arithmetic circuits can be configured to determine for r-limb 0, intermediate z-limbs 0 through K−1 of a set 0 of intermediate z-limbs, as products of r-limb 0 and a-limbs 0 through K−1.

The rows of partial products ("sets of intermediate z-limbs") generated from r1 through r5 include partial products generated from the r-limbs and different combinations of a-limbs and the modulus-multiple of the d-limbs. For example, in the row of partial products generated from r3, d-limbs d3, d4, and d5 and the modulus 5 are used in generating the three least significant intermediate z-limbs from r3, and the next two intermediate z-limbs are generated from a0 and a1. Notably, the most significant intermediate z-limbs the rows for r-limbs r1 through r5 are products of the r-limbs and the j LSBs (15 bits) of one of the a-limbs. For example, in the row of partial products generated from r3, the most significant intermediate z-limb in that row is a product of a2[14:0] and r3. As j bits of a2 is used to generate the partial product that is the most significant intermediate z-limb, d-limbs d3, d4, and d5 and the modulus 5 are used in generating the three least significant intermediate z-limbs from r3.

An array of arithmetic circuits can be configured to generate the sets of intermediate z-limbs from r1 through r5 as partial products of the r-limbs and different combinations of a-limbs and the modulus-multiple of the d-limbs. In general terms, the array of arithmetic circuits can be configured for each r-limb i, for i from 1 to K−1 to determine for each intermediate z-limb s from s=i to K−2 of set i, the intermediate z-limb s as a product of r-limb i and a-limb t for t=0 to K−2−i. For each intermediate z-limb s from s=0 to i−1 of set i, the array of arithmetic circuits determines intermediate z-limb s as a product of modulus, m, d-limb (K−i+s), and r-limb i. For intermediate z-limb K−1 of set i, the array of arithmetic circuits determines intermediate z-limb K−1 as a product of j low-order bits of a-limb (K−1−i) and r-limb i.

In generating the sets of intermediate z-limbs from r-limbs r0 through r5, the arithmetic circuits are configured to propagate carry bits from an arithmetic circuit that generated one intermediate z-limb in a set to the arithmetic circuit that generates the next intermediate z-limb in the set. For example, one arithmetic circuit can be configured to generate the intermediate z-limb 5*d5*r1. The carry bits resulting from that partial product are input to another arithmetic circuit to sum with the product of a0*r1.

The array of arithmetic circuits are configured to sum corresponding ones of the intermediate z-limbs from the sets of intermediate z-limbs. Row 306 shows the accumulation of the intermediate z-limbs into z-limbs z0 through z6 of Z.

For example, b2+a1*r0, a1*r1, a0*r2, 5*d5*r3, 5*d4*r4, and 5*d3*r5 are corresponding intermediate z-limbs that are summed by the arithmetic circuits to generate z-limb z2. It will be recognized that the order in which corresponding ones of the intermediate z-limbs in the sets are summed can be any order.

The example of FIG. 1 shows computation of G per step 1 of the modulo algorithm described above. According to step 1 of the modulo algorithm, G is computed as the product of the most significant M bits of Z and the modulus m, summed with the least significant Q bits of Z. M is the number of bits by which Z exceeds N. A logic circuit can determine M, which is shown as z6 in row 306 of FIG. 1. Q is defined as M+ceil ($\log_2$ m). In FIG. 1, the most significant M bits of Z are shown by block 308, which is labeled as z6. The product the most significant M bits of Z and m (e.g., m=5) can be computed by an arithmetic circuit that is configured to add the most significant M bits of Z to the value of the most significant M bits of Z left shifted by two bits, which is shown as block 310.

Figure 4:
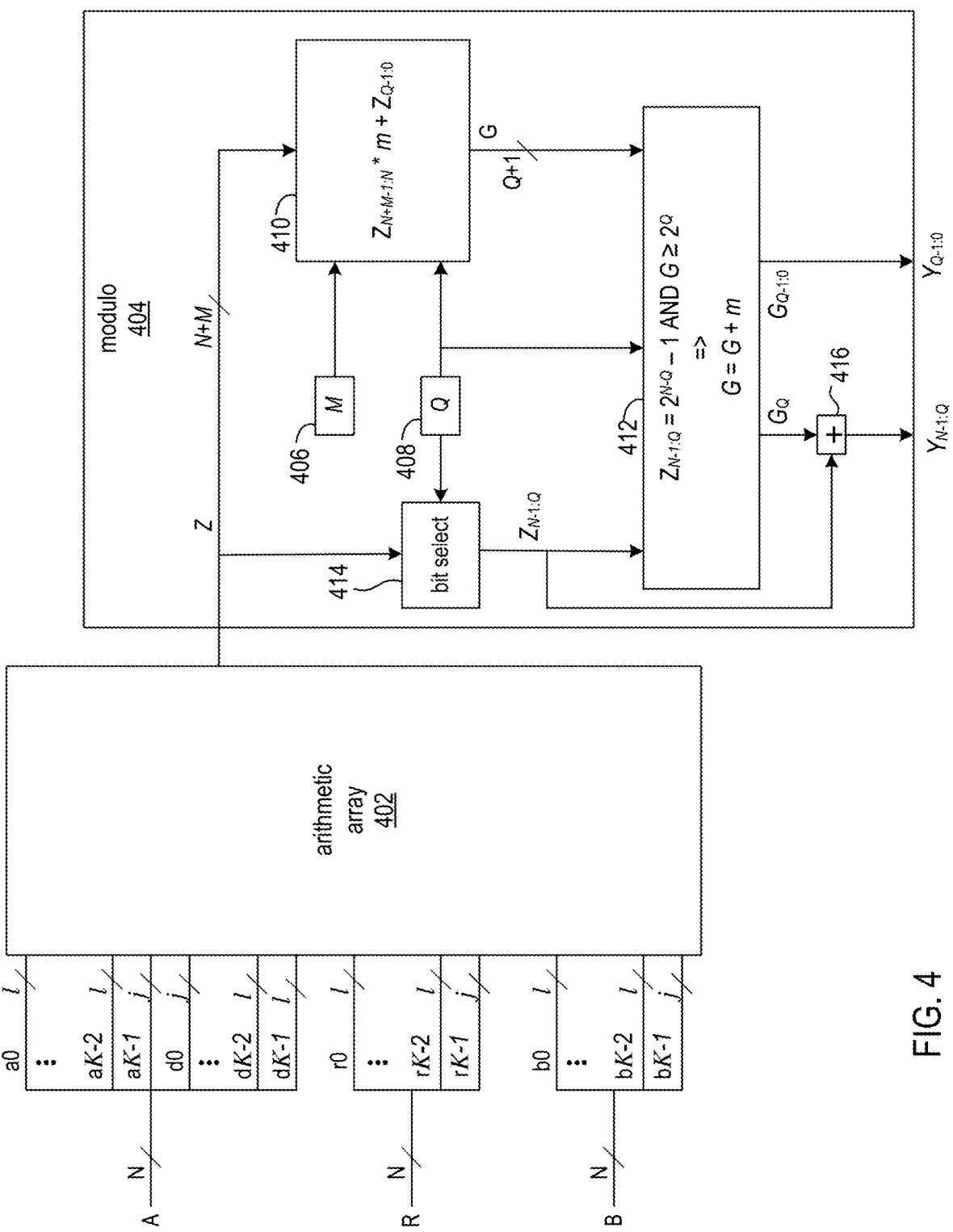
FIG. 4 shows a circuit arrangement configured to multiply integers A and R over a finite field P.

FIG. 4 shows a circuit arrangement configured to multiply integers A and R over a finite field P. The output is Y=(A*R+B) mod P as described above. The arithmetic array 402 is an array of arithmetic circuits that are configured to input the a-limbs, r-limbs, and b-limbs of the terms A, R, and B and compute Z=(A*R+B) consistent with the example of FIG. 1. The modulo circuit 404 can be a logic circuit configured to determine Y=Z mod P per the modulo algorithm described above.

Each of operands A, R, and B is N-bits wide and partitioned into K limbs. A is partitioned into two sets of limbs: a-limbs a0 through aK−1 and d-limbs d0 through dK−1. R is partitioned into r-limbs r0 through rK−1, and B is partitioned into b-limbs b0 through bK−1. The order of the limb numbers progresses from the LSBs to the MSBs of the operands. The a-limbs are operand A partitioned from the LSB to the MSB. Thus, a-limbs a0 through aK−2 have l bits, and aK−1 has j bits. The d-limbs are operand A partitioned from the MSB to the LSB. Thus, d-limb d0 has j bits, and d1 through dK−1 have l bits. The R and B operands are partitioned from LSB to MSB similar to operand A.

The arithmetic array 402 computes Z=(A*R+B) consistent with the example of FIG. 1, and outputs Z to the modulo circuit 404. The value of Z is represented by a total of N+M bits and is input to circuits 406, 410, and 412 of the modulo circuit 404.

M is the number of bits by which the number of bits that represent Z is greater than N. In practical use cases, m is selected to be a small integer, and Z can have N+l+ceil ($\log_2$ K) bits. Thus, M and Q can be determined from the values of/and K, and can be constants in programmable registers 406 and 408.

Circuit 410 selects bits N through (N+M−1) from Z, multiplies the value of those bits by m, and adds the product to the value of bits 0 through (Q−1) of Z to generate the value G (G is Q+1 bits). The value of G is input to logic circuit 412.

Logic circuit 412 conditionally increases the value of G by m. If the values of bits Q through (N−1) of Z are all 1 and G is greater than or equal to 24, then G is increased by m. The comparison with 24 can be performed by checking whether the MSB bit of G (bit Q of G) is 1 or 0. Circuit 414 selects bits Q through N−1 of Z.

Circuit 412 also includes selection circuitry that is responsive to the value of Q for selecting bits bits 0 through (Q−1) for output as bits 0 through (Q−1) of Y, and selecting bit Q of G to sum with bits Q through (N−1) of Z by adder circuit

416. Note that adder circuit 416 may generate a carry bit, and the carry bit can be ignored because logic circuit 412 handled the possibility of the carry bit by conditionally adjusting the value of G.

Figure 5:
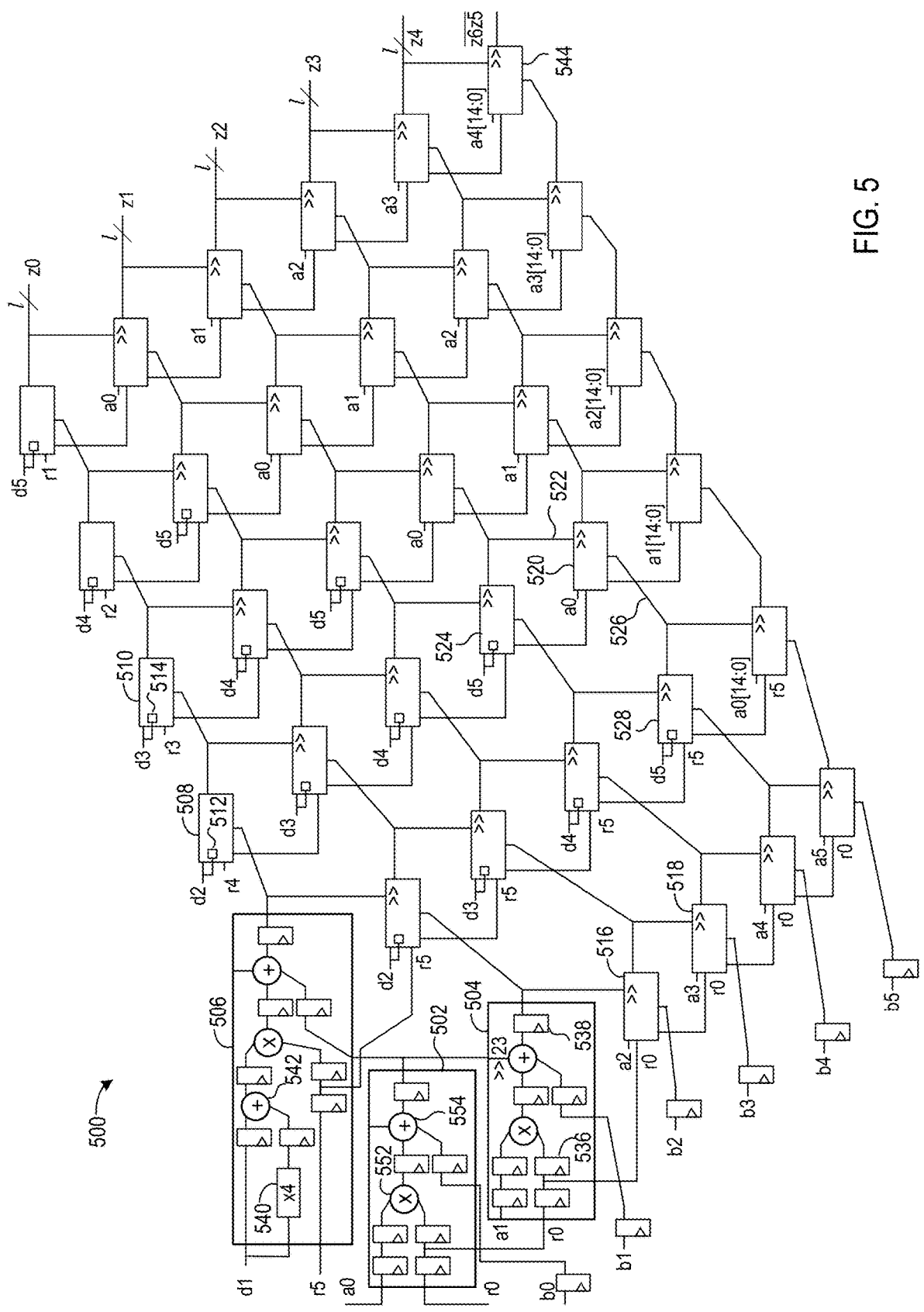
FIG. 5 shows a circuit diagram of an exemplary array of arithmetic circuits configured to determine the intermediate value of Z as described above.

FIG. 5 shows a circuit diagram of an exemplary array 500 of arithmetic circuits configured to determine the intermediate value of Z as described above. The exemplary array is K rows of K columns of arithmetic circuits by (K=6), where K is the number of limbs into which the operands are partitioned. In alternative implementations, the number of rows and columns of arithmetic circuits can be less than K, and input of the limbs can be time-multiplexed to determine Z. The order of computing the partial products from left to right is from r-limb r0 to r5, to r4, to r3, to r2, to r1. However, the order of computation of the partial products can be any order that is suitable for data pipelining in the implementation.

The arithmetic circuits can be circuits that are hardwired to multiply and accumulate input operands and that are configurable to shift and/or pre-add input operands. Exemplary arithmetic circuits include DSP48 and DSP58 circuits found in programmable devices from Xilinx, Inc., or comparable circuits in devices from other sources. The arithmetic circuits are identical instances in terms of hardwired circuitry, and individually configured to determine partial products consistent with the example of FIG. 3.

The array of arithmetic circuits is shown as being arranged in rows and columns. Each column of arithmetic circuits generates the partial products from one of the r-limbs, and each row accumulates the partial products from the arithmetic circuits in that row into a z-limb. For example, arithmetic circuits 502, 504, 516, and 518 are four of the six arithmetic circuits in the column that generates partial products from r0, and arithmetic circuits 502, 506, 508, and 510 are four of the arithmetic circuits involved in the accumulation of partial products for z0.

For purposes of computing the z-limbs, the arithmetic circuits can be configured generally in one of two ways to compute the partial products consistent with the example of FIG. 3. Arithmetic circuits that are configured to generate partial products from a-limbs are configured as shown by arithmetic circuits 502 and 504, and arithmetic circuits that are configured to generate partial products from d-limbs are configured as shown by arithmetic circuit 506. Others of the arithmetic circuits that are configured to compute partial products from d-limbs are shown with an extra block to signify the left-shift and pre-add of the d-limb (to compute d-limb*m). For example arithmetic circuits 508 and 510 are shown with blocks 512 and 514, respectively. Others of the arithmetic circuits that are configured to compute partial products from a-limbs are shown without the extra block. For example, arithmetic circuits 516 and 518 generate partial products from a-limbs a2 and a3, respectively.

Each of the arithmetic circuits has a multiplier circuit that generates a product from two operands and an adder circuit that sums the product with one or more input operands. For example, arithmetic circuit 502 includes multiplier circuit 552 and adder circuit 554. Each of the arithmetic circuits also includes registers for staging and delaying propagation of input operands. Examples of the registers are registers 536 and 538 in arithmetic circuit 504.

The arithmetic circuits that generate partial products from the d-limbs are configured to involve pre-shift and pre-add circuitry of the arithmetic circuit. The pre-shift and pre-add circuitry implements multiplication of the d-limb by m. In the example, m=5. The pre-shift left of the d-limb by 2 bits generates the product of 4* the d-limb, and adding that product to the d-limb provides a result that is 5*d-limb. The pre-shift left by two bits is exemplified by block 540, and the pre-add is exemplified by adder 542 in arithmetic circuit 506.

With exceptions of certain ones of the arithmetic circuits, the arithmetic circuits that generate partial products input an a-limb (or partial a-limb) or d-limb, an r-limb, carry bits, and the corresponding intermediate z-limb generated by an arithmetic circuit from another r-limb. For example, arithmetic circuit 520 inputs a0, r4, carry bits on line 522 from arithmetic circuit 524, and intermediate z-limb on line 526 from arithmetic circuit 528.

For the input of carry bits to an arithmetic circuit, the value is shifted right by N/2 bits (e.g., 23 bits), because the carry bits are the upper half of the output value from another of the arithmetic circuits. For example, the output value from arithmetic circuit 502 is shifted by 23 bits by arithmetic circuit 504 for summing with the partial product of a1 and r0 and the b-limb, b1. The arithmetic circuits can be configured to shift the input operand by a specified number of bits. The arithmetic circuits that contribute to generating z-limb z0 (e.g., 502, 506, 508, 510) do not input carry bits as the arithmetic circuits are the first in each column of circuits.

The z-limbs z0, z1, z2, z3, and z4 are the low-order l bits of the output values from the respective arithmetic circuits. The output from arithmetic circuit 544 includes all the bits of the value output from arithmetic circuit, which include the bits of both z6 and z5.

Figure 6:
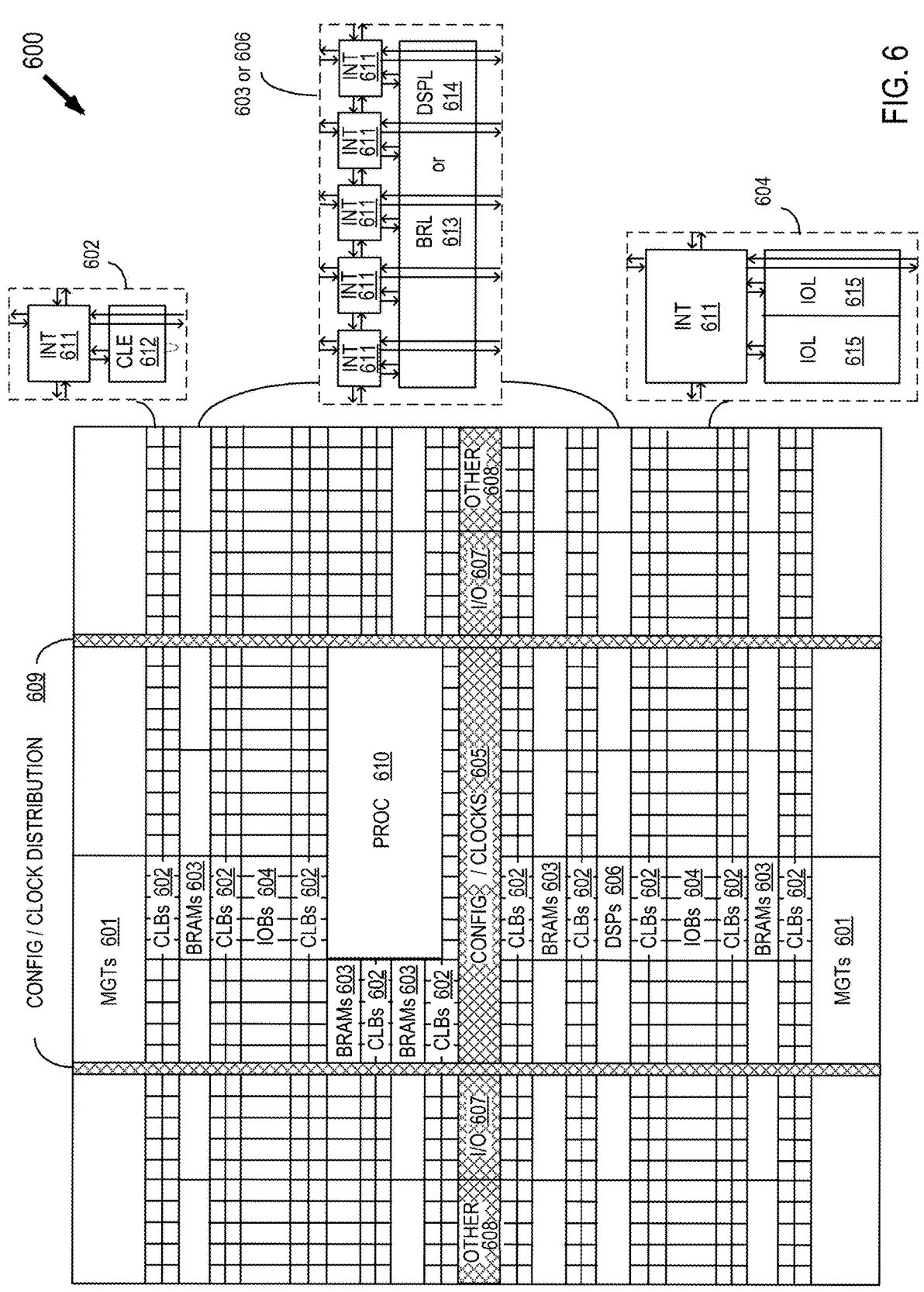
FIG. 6 shows a programmable integrated circuit (IC) on which the disclosed circuits and processes may be implemented.

FIG. 6 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown). The disclosed circuits and methods can alternatively be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

A columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for multiplying large integers over a finite field. Other aspects and features will be apparent to those skilled in the art from consideration of the specification. The circuits and methods can be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement for computing an order N polynomial, comprising:

a plurality of V decimation stages, each including respective multiply-and-accumulate circuitry, wherein the respective multiply-and-accumulate circuitry in each decimation stage k of the V decimation stages is configured to, in response to an input r-term and a plurality of input z-terms 0 through ($N_k$−1):

generate one or more output z-terms 0 through ($N_k/2$−1), wherein each output z-term i of the one or more output z-terms is a sum of input z-term (2i+1) of the input z-terms and a product of input z-term 2i and the input r-term; and generate an output r-term as a square of the input r-term;

wherein the respective multiply-and-accumulate circuitry in each decimation stage k for k≤(V−1) is configured to provide the output r-term and one or more output z-terms from decimation stage k as the input r-term and one or more input z-terms to the respective multiply-and-accumulate circuitry of decimation stage k+1; and a recursive stage having multiply-and-accumulate circuitry configured to:

input from the respective multiply-and-accumulate circuitry of decimation stage V, the output r-term as a recursive r-term and the one or more output z-terms as a-terms 0 through (T−1), and generate a polynomial output value z by a recursive evaluation of the recursive r-term, the a-terms 0 through (T−1), and a modulus, p.

2. The circuit arrangement of claim 1, wherein each respective multiply-and-accumulate circuitry is configured to:

in response to $N_k$ being odd:

assign a value of input z-term 0 as output z-term 0, and generate one or more output z-terms 1 through ($N_k/2$−1), wherein each output z-term i of the one or more output z-terms is a sum of input z-term (2i+1) of the input z-terms and a product of input z-term 2i and the input r-term; and in response to $N_k$ being even:

generate one or more output z-terms 0 through ($N_k/2$−1), wherein each output z-term i of the one or more output z-terms is a sum of input z-term (2i+1) of the input z-terms and a product of input z-term 2i and the input r-term.

3. The circuit arrangement of claim 1, wherein each decimation stage includes bypass circuitry configured to, in response to $N_k$ being odd, bypass input of the input z-term 0 to the multiply-and-accumulate circuitry of the decimation stage.

4. The circuit arrangement of claim 1, wherein each decimation stage includes bypass circuitry configured to, in response to the one or more input z-terms including only one input z-term, bypass input of the one input z-term to the multiply-and-accumulate circuitry of the decimation stage and output the one input z-term as one output z-term.

5. The circuit arrangement of claim 1, wherein each decimation stage includes:

a first-in-first-out (FIFO) command buffer; and a control circuit coupled to the FIFO command buffer and to the respective multiply-and-accumulate circuitry, wherein the control circuit is configured to:

provide, in response an input value of $N_k$ from the FIFO command buffer indicating a number of the one or more input z-terms is two or more input z-terms, the input r-term and the two or more input z-terms to the respective multiply-and-accumulate circuitry, and provide an output value of $N_k$ that indicates a number of the one or more output z-terms.

6. The circuit arrangement of claim 1, wherein the respective multiply-and-accumulate circuitry of each decimation stage includes an array of arithmetic circuits, and each arithmetic circuit is configured to determine a partial product of the input z-term 2i and the input r-term.

7. The circuit arrangement of claim 1, wherein the respective multiply-and-accumulate circuitry of each decimation stage includes a processor circuit configured with instructions that cause the processor circuit to generate the one or more output z-terms 0 through ($N_k/2$−1) and generate the output r-term.

8. The circuit arrangement of claim 1, wherein the multiply-and-accumulate circuitry of the recursive stage includes a processor circuit configured with instructions that cause the processor circuit to generate the polynomial output value z by the recursive evaluation of the recursive r-term, the a-terms 0 through (T−1), and the modulus, p.

9. The circuit arrangement of claim 1, wherein the multiply-and-accumulate circuitry of the recursive stage includes an array of arithmetic circuits, and each arithmetic circuit is configured to determine a partial product of the recursive r-term and a recursive z-term.

10. The circuit arrangement of claim 1, wherein the multiply-and-accumulate circuitry of the recursive stage is configured to:

generate a recursive z-term 1 as a sum of a-term 1 and a product of a-term 0 and the recursive r-term, modulo p;

generate a recursive z-term t, for each a-term t of the T a-terms for 2≤t≤T−1, as a sum of a-term t and a product of the recursive r-term and recursive z-term (t−1); and generate the polynomial output value z as a product of recursive z-term (T−1) and the recursive r-term, modulo p.

11. A method for computing an order N polynomial, comprising:

performing by respective multiply-and-accumulate circuitry in each decimation stage k of a plurality of V decimation stages, in response to an input r-term and a plurality of input z-terms 0 through ($N_k$−1), operations including:

generating one or more output z-terms 0 through ($N_k/2$−1), wherein each output z-term i of the one or more output z-terms is a sum of input z-term (2i+1) of the input z-terms and a product of input z-term 2i and the input r-term, and generating an output r-term as a square of the input r-term;

providing, by the respective multiply-and-accumulate circuitry in each decimation stage k for k≤(V−1), the output r-term and one or more output z-terms from decimation stage k as the input r-term and one or more input z-terms to the respective multiply-and-accumulate circuitry of decimation stage k+1;

performing in a recursive stage by multiply-and-accumulate circuitry, operations including:

inputting from the respective multiply-and-accumulate circuitry of decimation stage V, the output r-term as a recursive r-term and the one or more output z-terms as a-terms 0 through (T−1), and generating a polynomial output value z by a recursive evaluation of the recursive r-term, the a-terms 0 through $(T-1)$, and a modulus, p.

12. The method of claim 11, wherein the performing operations by each respective multiply-and-accumulate circuitry includes:

in response to $N_k$ being odd:

assigning a value of input z-term 0 as output z-term 0, and generating one or more output z-terms 1 through $(N_k/2-1)$, wherein each output z-term i of the one or more output z-terms is a sum of input z-term $(2i+1)$ of the input z-terms and a product of input z-term 2i and the input r-term; and generating, in response to $N_k$ being even, one or more output z-terms 0 through $(N_k/2-1)$, wherein each output z-term i of the one or more output z-terms is a sum of input z-term $(2i+1)$ of the input z-terms and a product of input z-term 2i and the input r-term.

13. The method of claim 11, further comprising bypassing in each decimation stage, in response to $N_k$ being odd, inputting of the input z-term 0 to the multiply-and-accumulate circuitry of the decimation stage.

14. The method of claim 11, further comprising bypassing in each decimation stage, in response to the one or more input z-terms including only one input z-term, inputting of the one input z-term to the multiply-and-accumulate circuitry of the decimation stage and output the one input z-term as one output z-term.

15. The method of claim 11, further comprising:

providing the input r-term and the two or more input z-terms by a control circuit (206) in a decimation stage to the respective multiply-and-accumulate circuitry of the decimation stage, in response an input value of $N_k$ from a FIFO command buffer in the decimation stage indicating a number of the one or more input z-terms is two or more input z-terms; and providing an output value of $N_k$ that indicates a number of the one or more output z-terms by the control circuit.

16. The method of claim 11, further comprising determining partial products of the input z-term 2i and the input r-term by an array of arithmetic circuits of the respective multiply-and-accumulate circuitry of each decimation stage.

17. The method of claim 11, wherein the generating the one or more output z-terms 0 through $(N_k/2-1)$ and the generating the output r-term is performed by a processor circuit executing program instructions.

18. The method of claim 11, wherein the generating the polynomial output value z by the recursive evaluation of the recursive r-term, the a-terms 0 through $(T-1)$, and the modulus, p is performed by a processor executing program instructions.

19. The method of claim 11, further comprising determining partial products of the recursive r-term and a recursive z-term by an array of arithmetic circuits of the multiply-and-accumulate circuitry of the recursive stage.

20. The method of claim 11, wherein the performing operations of the recursive stage includes:

generating a recursive z-term 1 as a sum of a-term 1 and a product of a-term 0 and the recursive r-term, modulo p;

generating a recursive z-term t, for each a-term t of the T a-terms for $2 \leq t \leq T-1$, as a sum of a-term t and a product of the recursive r-term and recursive z-term $(t-1)$; and generating the polynomial output value z as a product of recursive z-term $(T-1)$ and the recursive r-term, modulo p.

* * * * *